(12) United States Patent
Pollington et al.

(10) Patent No.: US 6,228,008 B1
(45) Date of Patent: May 8, 2001

(54) TOOL CAROUSEL

(75) Inventors: Andrew Roy Pollington; Harish Devji Mandalia, both of Leicester (GB)

(73) Assignee: Bridgeport Machines Limited, Leicester (GB)

( * ) Notice: Subject to any disclaimer, the term of this patent is extended or adjusted under 35 U.S.C. 154(b) by 0 days.

(21) Appl. No.: 09/540,667

(22) Filed: Mar. 31, 2000

Related U.S. Application Data

(62) Division of application No. 09/150,967, filed on Sep. 11, 1998, now Pat. No. 6,155,961.

(30) Foreign Application Priority Data

Sep. 12, 1997 (GB) .................................................. 9719544

(51) Int. Cl.$^7$ .................................................. B23Q 3/157
(52) U.S. Cl. ................ 483/67; 211/1.52; 483/58
(58) Field of Search ................ 483/58, 4, 6, 7, 483/56, 32, 67, 68, 66, 12, 1; 318/467; 700/169; 211/1.52, 70.6

(56) References Cited

U.S. PATENT DOCUMENTS

| | | | | |
|---|---|---|---|---|
| 4,008,518 | * | 2/1977 | Hague et al. | 483/1 |
| 4,190,947 | * | 3/1980 | Sato et al. | 483/43 |
| 4,356,621 | * | 11/1982 | Tomita et al. | 483/7 |
| 4,358,888 | * | 11/1982 | Zankl et al. | 483/54 |
| 4,398,136 | * | 8/1983 | Tanaka et al. | 318/467 X |
| 4,426,763 | * | 1/1984 | Hornok et al. | 483/6 |
| 4,489,629 | * | 12/1984 | D'Andrea | 483/32 X |
| 4,631,684 | * | 12/1986 | Akasofu et al. | 700/169 X |
| 5,300,006 | * | 4/1994 | Tanaka et al. | 483/56 |

* cited by examiner

*Primary Examiner*—William Briggs
(74) *Attorney, Agent, or Firm*—Ohlandt, Greeley, Ruggiero & Perle, L.L.P.

(57) ABSTRACT

A tool carousel comprising a plurality of wheel sections which can be joined together to form a carousel wheel and a plurality of tool-holding portions. Each tool-holding portion and wheel section is configured such that each tool-holding portion can be journalled to a respective wheel section for rotation between a tool-storage position and a tool-accessing position in which a tool can be installed thereupon or removed therefrom.

3 Claims, 11 Drawing Sheets

ТOOL CAROUSEL

This is a division, of application Ser. No. 09/150,967 filed Sep. 11, 1998 U.S. Pat. No. 6,155,961.

BACKGROUND OF THE INVENTION

1. Field of the Invention

This invention relates to a tool carousel for use in a tool changer on a machining centre.

2. Background Art

A tool carousel comprises a wheel-like structure which, in use, carries a series of individually removable tools. In most cases, the carousel comprises a rotational index means, so as to enable any selected one of the tools carried by the carousel wheel to be located at a predetermined rotational position, whereat a transfer mechanism can present the selected tool to a machine tool for use in a machining operation.

FIG. 1 shows a typical example of a machining centre which includes a tool carousel. As can be seen, the tool carousel wheel 1 is mounted upon a horizontal rotational axis adjacent a transfer mechanism 2. Referring to FIG. 2, it will be seen that the transfer mechanism 2 comprises a transfer arm 4 for transferring tools between the carousel wheel 1 and a machine tool spindle 3. The transfer arm rotates about a central rotation axis 8 and has a tool grip at each end.

As can be best seen in FIG. 3, the carousel wheel 1 comprises a plurality of circumferentially consecutive pots 6, each of which is used for storing a respective tool. In the storage position, each of the pots orientates its respective tool with its axis generally horizontal. However, when a tool is specified by the machine control, the carousel wheel 1 is rotated until the correct tool is located in the transfer position 5, and the pot containing this tool is then rotated through 90° about a horizontal axis which is perpendicular to the rotational axis of the carousel wheel. As a consequence, the pot hangs vertically down and in the manner of the pot designated 7. In this position, the tool has its axis parallel to the centre line of the machine tool spindle 3. Once the pot is in this position, the transfer arm 4 is able to rotate about its vertical rotation axis 8 and remove the selected tool from its pot 7 whilst simultaneously removing any existing tool from the spindle nose 3. As it continues to rotate, the position of the two tools is reversed, the selected tool is presented to the spindle nose, and the deselected tool is presented to the appropriate pot on the carousel 1. That pot is then rotated back up through 90°, so that the deselected tool is stored with its axis inclined horizontally, in common with the other tools stored in the carousel.

Tools for use in a machine tool are invariably heavy, metal items and the carousel wheel of a tool carousel therefore has to be strong and sturdy enough to carry all of the tools without buckling or breaking over a long period of time during which the tool carousel is required to operate reliably, without breakdown. It has therefore been the practice to form carousel wheels of known tool carousels from metal.

FIG. 4 shows a vertical section through a known tool changer incorporating such a carousel. From the figure, it can be seen that a pot 105 has a generally cylindrical form and is attached to the hub 124 of a carousel wheel via a rotation axis 117. The pot 105 is fitted with a collar 119 at an end thereof which is situated at the top of the pot when it is rotated through 90° about the axis 117 at the tool access position, as shown in dotted lines in FIG. 4. Axially inwardly of the collar 119, there is located a retention collar 104 that comprises a central axial bore into which a number of balls 100 are resiliently urged to project. In use, a pull-stud of a tool holder is located within the bore and gripped by the balls 100. When the tool is to be extracted, this is achieved by axial displacement of an extractor 118 which can be axially pushed into the bore, to force the pull-stud out.

A dog 102 is provided in the mouth of the pot 105 for retaining the correct orientation of the tool holder. A tool identification tag is provided at 101.

The pot 105 is integrally formed with an arm 103. The arm 103 projects radially from the side of the pot body and terminates with a transversely extending section, upon which is fitted a rotatable pusher wheel 108 and a bearing 109. The pot is retained in the storage position shown in FIG. 4 by the action of the bearing 109, which bears against a bearing plate 125. The plate is provided with a local slot at the pot release position, thus enabling the pot to be rotated about the axis 117, when it is located there. The pusher wheel 108 is adapted to fit within a mouth 123 of a fork 122 mounted at the end of a rod 121 of a vertically aligned piston 120. As the carousel wheel rotates, the pusher wheel 108 of each pot assembly consecutively enters the mouth 123 of the fork 122 from the side. When the appropriate tool holder is in position, pneumatic cylinder 120 is actuated, so as to cause the piston rod 120 to extend vertically downwards. As this happens, the pusher wheel 108 is urged downwardly by virtue of the fact that it is constrained within the mouth 123 of the fork 122. This downward movement causes the pot 105 to rotate about the axis 117, thereby eventually bringing the tool holder into the position shown in chain-dotted line in FIG. 4. From this position, a transfer arm can transfer the tool to the machine head, as generally described in relation to FIGS. 1 to 3.

SUMMARY OF THE INVENTION

It is an object of the invention to provide a tool carousel which is easier and less expensive to manufacture and, if necessary, repair than that of the known tool changer.

According to a first aspect of the invention there is provided a tool carousel according to claim 1. Preferred features of this aspect of the invention are set out in claims 2 to 21. According to a second aspect of the invention, claim 25 provides a lifting and lowering mechanism for a tool carousel wheel. A third aspect of the invention is set out in claim 28 and provides a drive mechanism for a tool carousel. Preferred features of the various aspects of the invention are set out in the dependent claims.

BRIEF DESCRIPTION OF THE DRAWINGS

Embodiments of the invention will be described by way of example and with reference to the accompanying drawings in which.

DETAILED DESCRIPTION

Figure 20:
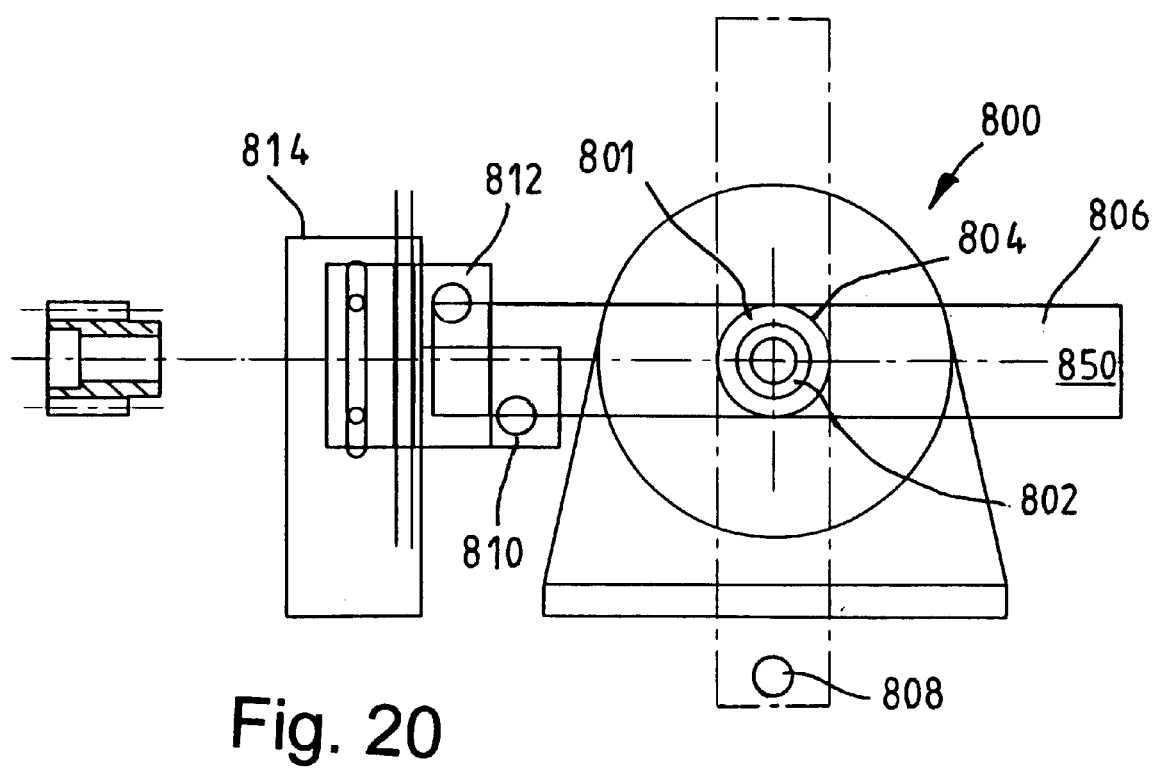
FIG. 20 schematically shows a positioning mechanism for use with a carousel wheel gear index.
Figure 21:
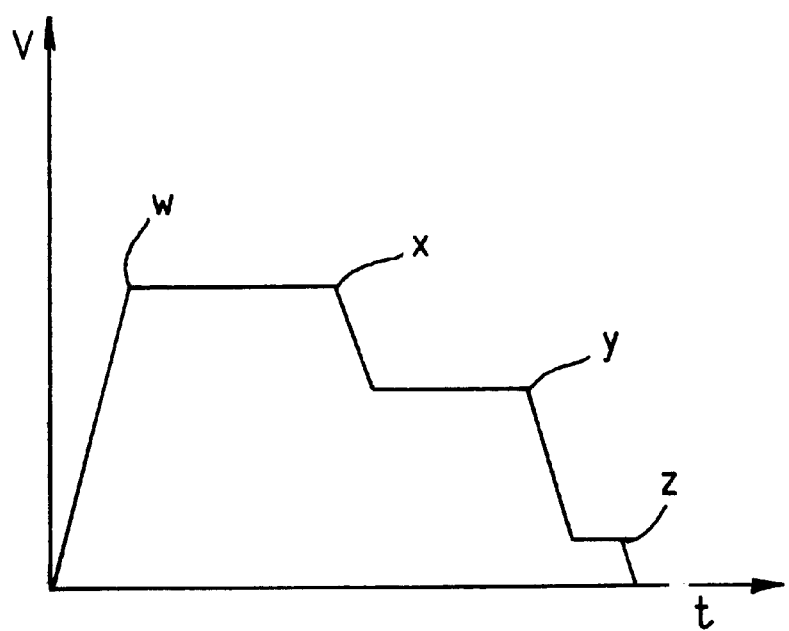

FIG. 21 is a graph of rotational speed relative to angular orientation of the shaft of the drive motor shown in FIG. 20.

Figure 5:
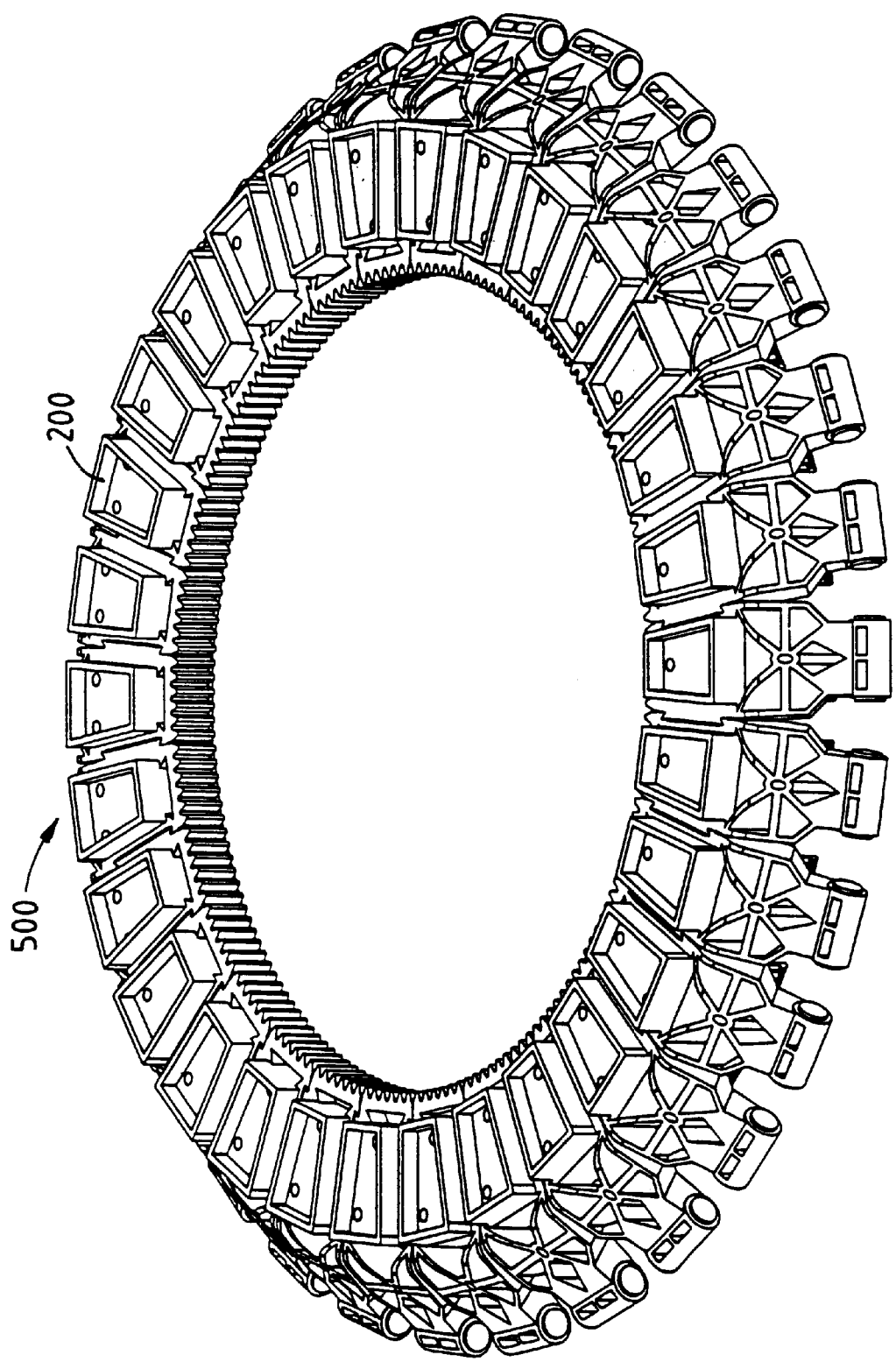
FIG. 5 is a perspective view of thirty bracket units, assembled together to form part of a tool carousel in accordance with the invention.
Figure 6:
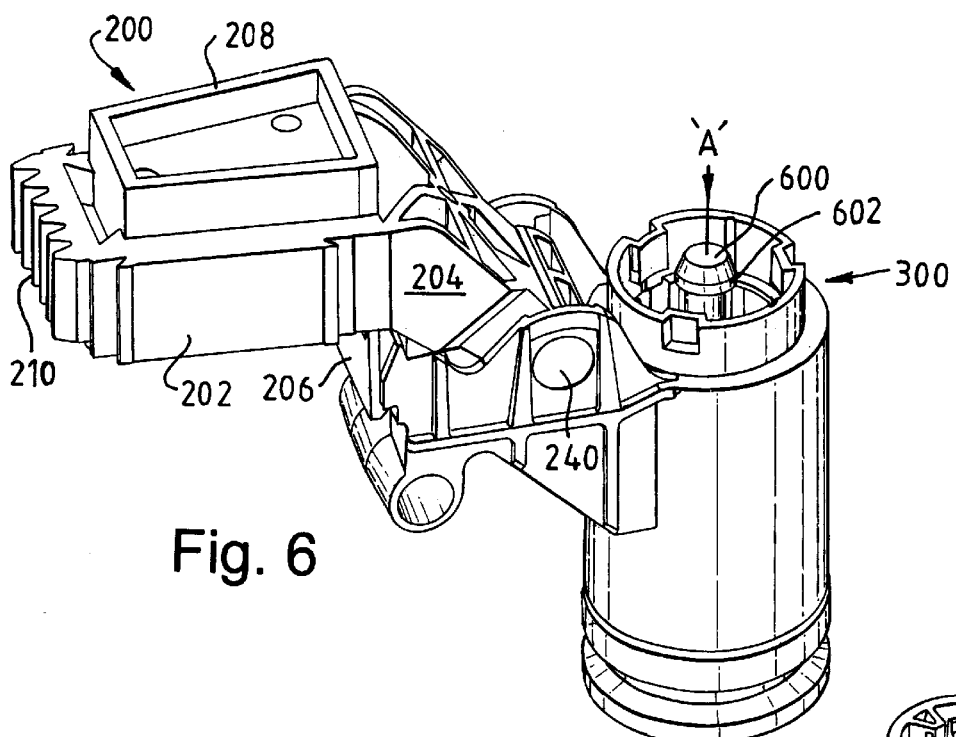
FIG. 6 is a perspective view of one of the bracket units of FIG. 5 in conjunction with a pot unit and retention collar in accordance with the invention.

Referring to FIGS. 5 and 6, it can be seen that the tool carousel according to this embodiment of the invention comprises a number of bracket units 200 which are interlocked to form a carousel wheel 500. Each bracket unit 200 is connected with a respective pot unit 300 and retention collar 400. Each bracket unit 200, pot unit 300 and retention collar 400 is injection moulded from a plastics material which comprises a chemical lubricant. Of course, the components could be manufactured from a different material and an alternative lubricant could be used.

Each of the three primary components shown in FIG. 6 will now be described in detail.

Where the bracket units are described, expressions such as "radial", "axial" and "circumferential" are used with reference to the assembled carousel wheel shown in FIG. 5.

One of the bracket units 200 is shown in detail in FIGS. 7A to 9. It can be seen that the unit comprises a main bracket body portion 202, which has a generally wedge-shaped profile when viewed in plan, such as in FIG. 9. On a first radially extending side of the body portion 202, there is provided a male dovetail portion 212. On the opposite radially extending side of the body portion 202, there is provided a female dovetail portion 214. Each bracket unit 200 has the same configuration, so the dovetail formations from two adjacent bracket units 200 can be interlocked, so as to join them together. Due to the wedge-shape of the body portion 202, thirty bracket unit can be joined together so as to form a complete ring, thereby defining the carousel wheel shown in FIG. 5. Of course, it is not necessary for the carousel ring to be formed from thirty bracket assemblies. If it is intended for the carousel wheel to hold a smaller or greater number of tools, then a corresponding number of bracket units should be used. In such a case, the bracket units will need to have the radially extending sides of the body portion 202 moulded at an appropriately different angle of separation. Generally speaking, if a greater number of bracket assemblies are required in order to house a respectively larger number of tools, then the angle between the two sides of the body portion 202 will be relatively smaller. On the other hand, if fewer bracket units are required, then the angle between the two sides of the body portion 202 would be relatively greater.

This configuration is particularly suitable for manufacture from plastics materials, hence a lightweight, relatively inexpensive wheel can be constructed, without sacrificing strength and durability. Furthermore due to its modular construction, the wheel can easily be repaired or modified.

Integrally formed with the body portion 202, there is a hinge arm 204. The hinge arm 204 extends from the radially outer end of the body portion 202 and is inclined at an angle of 50° to the carousel wheel axis. As can be seen particularly clearly in FIGS. 8 and 9, the hinge arm 204 is defined by a generally box-like outer wall structure 216 which is strengthened by three intersecting cross-webs 218, 220 and 222. An integrally formed cylinder 224 is situated at the intersection of the three cross-webs 218, 220 and 222. It should be noted that the cross-webs and the cylinder all have walls which are generally parallel with the wheel axis. This feature can best be seen in FIG. 6.

The box-like section of the hinge arm 204 has generally parallel sides 226 and 228. Moving away from the junction of the hinge arm 204 with the body portion 202, the walls 226 and 228 lead into a distal end portion of a relatively narrower width 230, via inclined walls 232 and 234. The distal end portion of the hinge arm 230 is provided with a transversely extending barrel 236 having a generally circular cross-section. The barrel 236 has length which is very slightly longer than the width of the distal end portion 236. Each end face 238 of the barrel 236 is provided with a respective axle lug 240 of a generally circular cross-section.

The barrel 236 comprises a pair of pockets 242, each having a rectangular cross-section. The pockets 242 extend in a direction parallel to the cross-webs 218–222 and the wheel axis.

The cross-webs, 218–222, the cylinder 224 and the pockets 242 result in a strong, yet lightweight unit that can be manufactured from a relatively small amount of material.

Figure 7A:
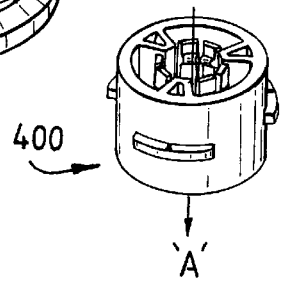
FIGS. 7A, 7B and 8 are perspective views of the bracket unit of FIG. 6.
Figure 7A:
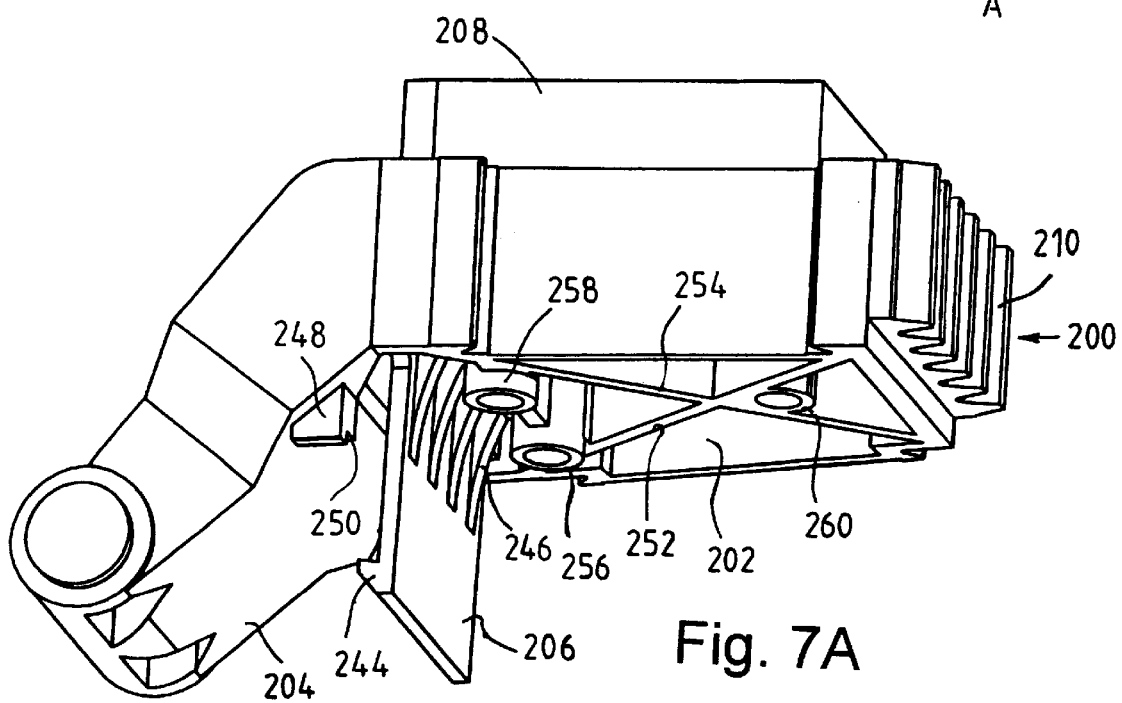
Figure 7B:
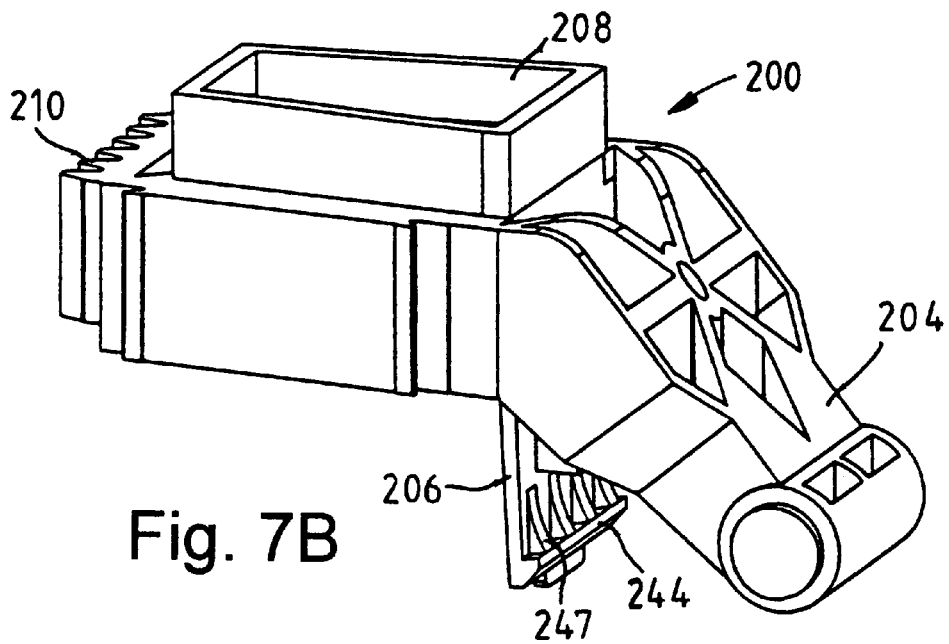
Figure 8:
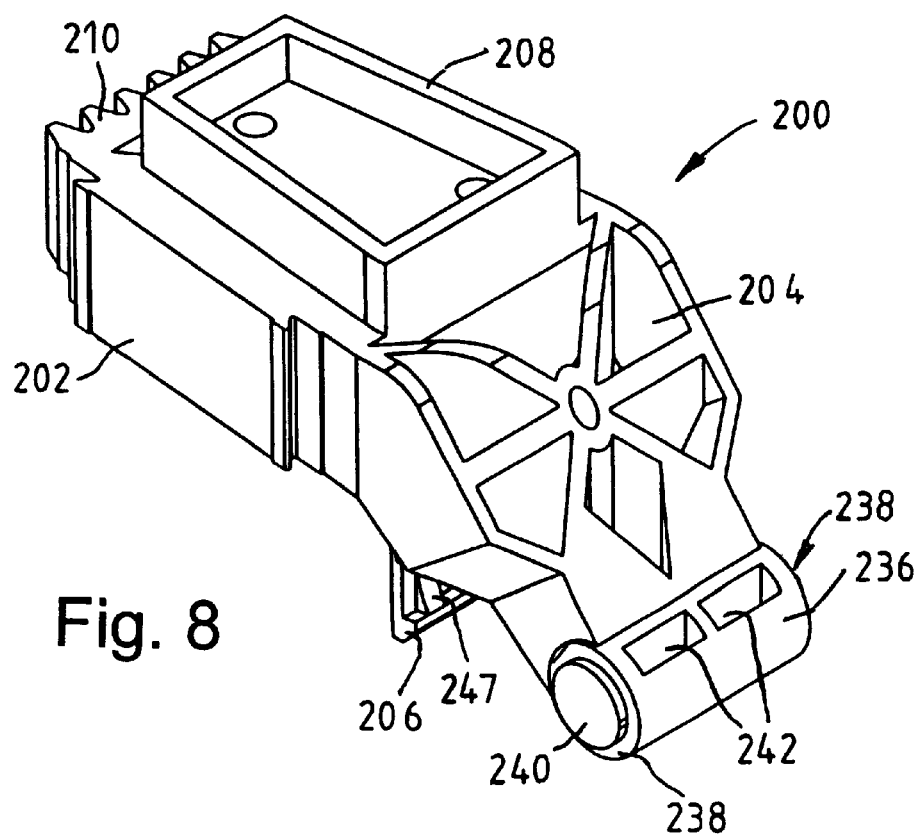

As can be seen most clearly in FIGS. 7A and 7B, a flexible tongue 206 extends perpendicularly from the bracket unit body 202 from a region close to the junction of the hinge arm with the body portion 202. The tongue 206 comprises an elongate hook portion 244 extending transversely along its distal end, so as to face generally towards the barrel 236. The tongue 206 is provided with four integrally formed ribs 246 on the opposite side to the hook portion 244 and in the region of the end at which it is joined to the body portion 202. The ribs 246 each have a thickness which tapers in a curved fashion from the junction of the tongue 206 and the body portion 202 towards the distal end of the tongue 206. The ribs 246 serve to constrain the flexion of the tongue 206 in a gradually reducing fashion towards its distal end, thereby providing a precisely controlled spring characteristic. The tongue comprises a further four ribs 247 on its opposite face, these ribs being directed towards the barrel and tapering in thickness from the hook portion 244 to the axial centre of the tongue. The ribs 247 reduce stresses in this part of the unit to an acceptable level when the unit is fully loaded.

On a surface of the hinge arm 204 which generally faces the tongue 206, there are provided a pair of stops 248, one of which can be seen clearly in FIG. 7A. Each stop is located generally towards the side of the hinge arm 204 and includes a square-section rebate 250 running in a direction generally perpendicular to the axis of the tongue 206.

As can be seen from FIGS. 7A and 7B, the body portion 202 has a general box-structure which is strengthened by a pair of further cross-webs 252 and 254. This structure also provides strength with low weight and requires a relatively small amount of material for manufacture. Extending from the tongue-side face of the body portion 202 are a pair of lugs 256 and 258, which extend generally parallel to the tongue 206. Each lug is generally in the form of a cylinder which extends into the box of the body portion 202.

Figure 9:
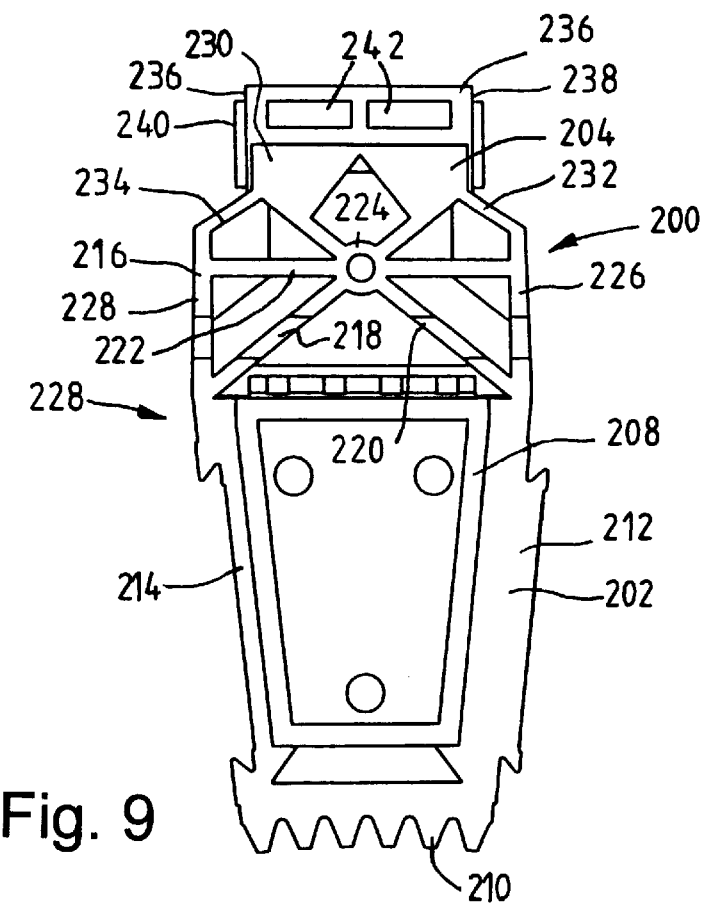
FIG. 9 is a plan view of the bracket unit of FIGS. 7 and 8.

As can be seen from FIG. 9, the bores of the cylinders 256, 258 extend through to the opposite surface of the body portion 202. A further generally cylindrical portion 260 is situated in a crook defined between the cross-webs 252 and 254 and generally towards the opposite end of the body portion 202. As with cylinders 256 and 258, the bore of cylinder 260 extends through to the opposite surface of the body portion 202.

Lugs 256, 258 are used for radial positioning in conjunction with an annular groove in the hub upon which the carousel wheel 500 is mounted. If the annular groove is replaced by a series of accurately bored holes, the lugs can be used for circumferential as well as radial positioning of the bracket units. In such a case, the dovetail formations 212, 214 could be omitted.

The opposite surface of the body portion 202 is provided with a generally trapezoidal wall 208 that extends perpendicularly from the face of the body portion 202 in a direction parallel to the wheel axis. When the bracket units are assembled together to form a carousel wheel, the walls 208 together define a series of radial slots which are used as carousel-locator slots in a "Geneva wheel" mechanism for controlling the rotational position of the carousel wheel.

The end face of the body portion 202 that faces radially inwardly, when the bracket units are connected together as shown in FIG. 5, comprises a series of radially-inwardly facing teeth 210 which, in conjunction with the teeth provided on the other connected bracket units 200 define a circular gear rack.

In use, the gear rack is used to control the rotational orientation of the carousel wheel. Since both the Geneva mechanism and the gear rack have the same general purpose, one or the other may be deleted. However if both are provided on the bracket units, a choice of rotational position control mechanisms is provided, without requiring two different types of bracket unit to be produced.

Referring to FIGS. 6 and 10A to 12, the pot units 300 will now be described.

Each pot unit comprises a tool cylinder 302 integrally formed with a hinge arm 304, which extends generally radially from an outer surface of the tool cylinder 302. The hinge arm 304 is hollow and formed from two generally planar flank walls 308 joined by a transverse end wall 310 at their distal ends. Each of the flank walls 308 comprises a circular aperture 312. Due to the natural resilience of the flank walls 308, the apertures 312 snap-fit over the axle lugs 240 provided on a bracket unit. The attachment of a pot unit to a bracket unit in this manner can be seen clearly in FIG. 6. As an alternative, the hinge arm 204 could be constructed to provide the necessary resilience to enable the snap-fit. Each flank wall 308 comprises a cut-away portion 314 which has a generally V-shaped profile, with a somewhat rounded bottom. The cutaway portions 314 are set into the respective edges of the flank walls 308 which address a bracket unit when the two are connected together and arranged in the manner of FIG. 6. The cut-away portions 314 serve to accommodate the box portion 316 of the bracket assembly.

The end wall 310 of the hinge arm 304 is provided with a series of axially extending ridges 316 which interlock with ribs 247 provided on the bracket unit 300.

Each of the ridges 316 terminates in an undercut 322. In use, the transversely extending hooked portion 244 provided on the tongue 206 of the bracket unit 200 snap-fittingly locates underneath the undercut 322 when the pot is rotated about the hinge 240, 312 in the clock-wise direction, to the position shown in FIG. 6. This secures the position of the pot unit 300, relative to the bracket unit 200. Although this clipping method has been found particularly effective, other arrangements may be employed. For example, a much bigger clip, for gripping a cylinder, may be provided on each bracket unit 200.

On the axially opposite side to the cut-away portions 314, the hinge arm 304 is provided with an integrally formed barrel 318. The barrel comprises a bore 320, which extends in a direction perpendicular to the axial direction and the radial direction of the cylinder 302. In use, the barrel co-operates with a lifting mechanism which comprises a fork 122 for constraining the barrel, the mechanism being used to cause rotation of the pot assembly about the hinge 312, 240. Such a mechanism is described below.

The hinge arm 304 further comprises an internal, lateral cross member 324 for strength and stiffness. Two further, mutually parallel internal walls 325 extend perpendicular to the cross member 324. These also enhance the stiffness of the structure.

Figure 10A:
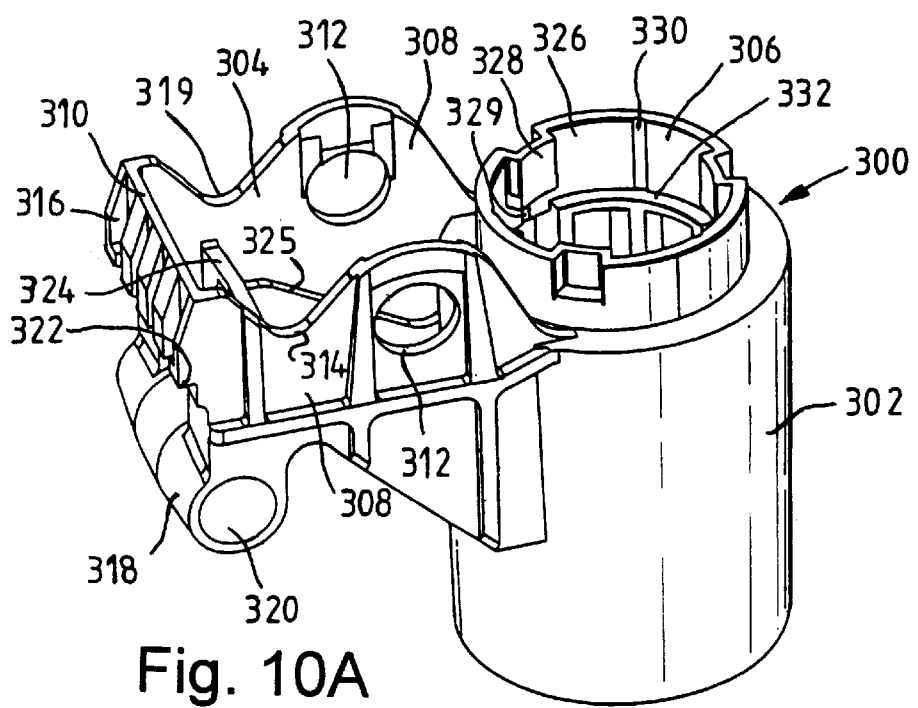
FIGS. 10A and 10B are perspective views of the pot unit of FIG. 6.
Figure 10B:
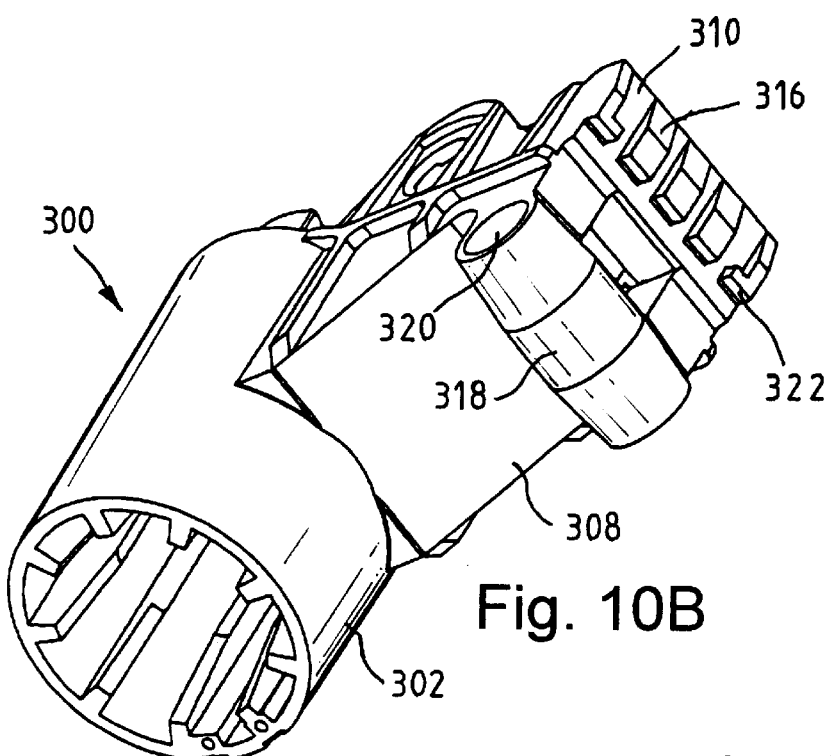
Figure 11:
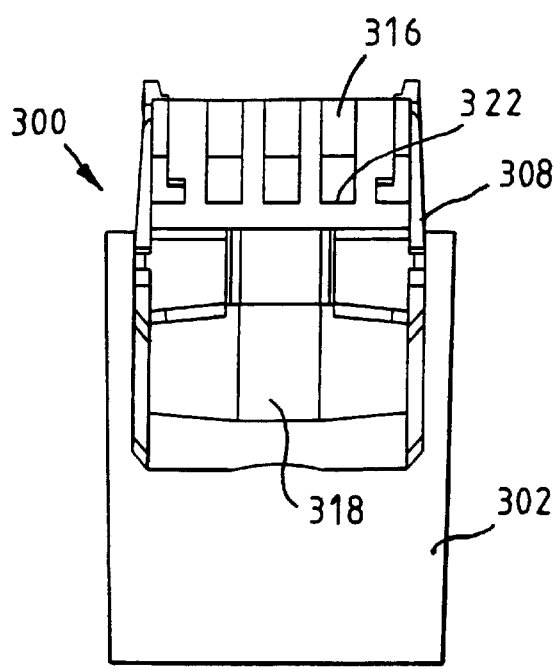
FIG. 11 is a rear elevation of the pot unit of FIGS. 10A and 10B.
Figure 12:
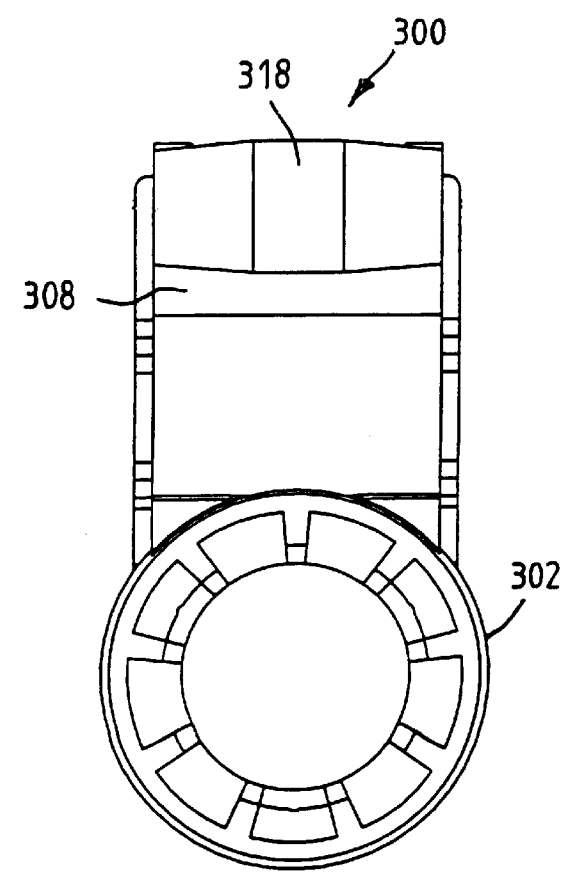
FIG. 12 is an underneath view of the pot unit of FIGS. 10 and 11.

The tool cylinder 302 is provided, at one axial end, with a seat portion 306 for accommodating a retention collar 400. Referring to FIG. 10, it will be seen that the seat portion 306 takes the form of an axially extending seat cylinder 326 concentrically situated at one end of the tool cylinder 302. Extending radially into the mouth of the seat cylinder 326, there are provided three lugs 328 at 120° intervals. Circumferentially in line with each lug and axially inwardly of the mouth of the cylinder 326, there is provided an elongate recess channel 329, which has a part-circular cross-section. A similarly shaped channel 330 is provided between each pair of lugs 328 and extends from the mouth of the cylinder 326 to a shoulder 332 which faces axially back towards the mouth of the cylinder 326.

Figure 13:
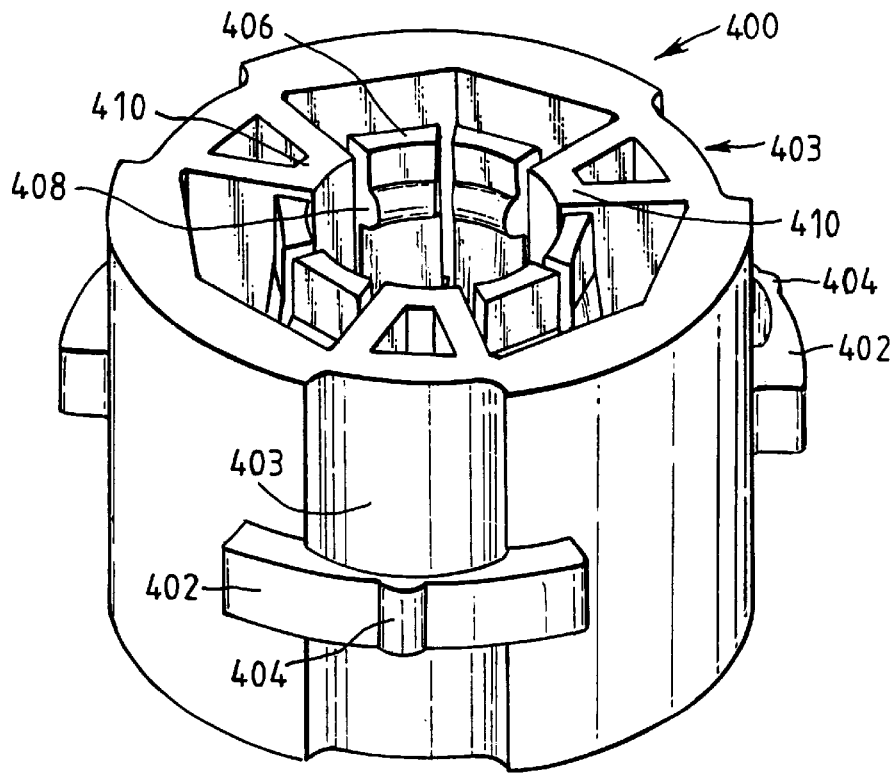
FIG. 13 is a perspective view of the retention collar of FIG. 6.
Figure 14:
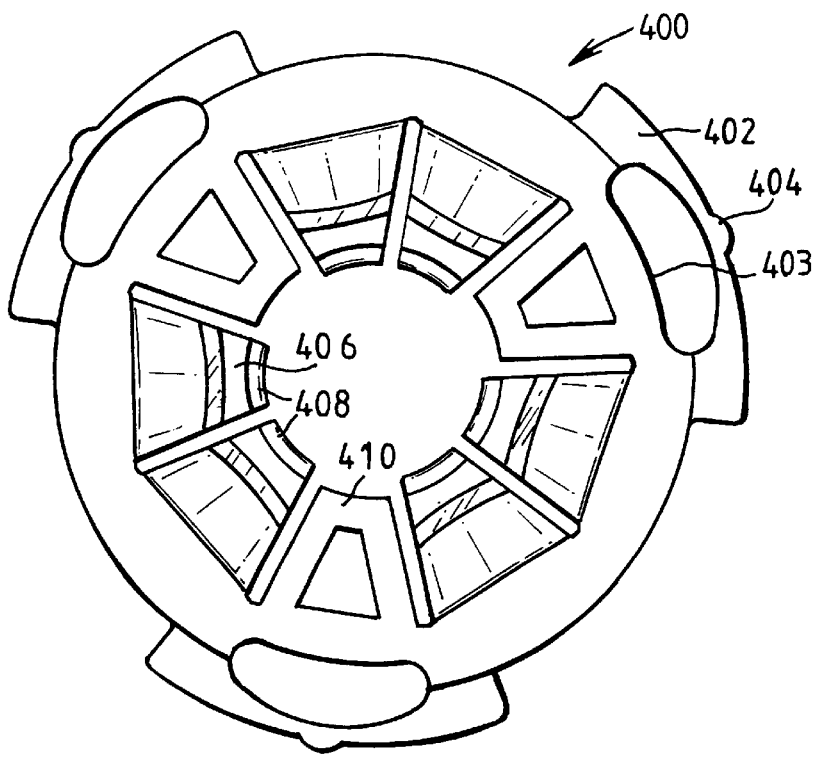
FIG. 14 is a plan view of the retention collar of FIG. 13.
Figure 15:
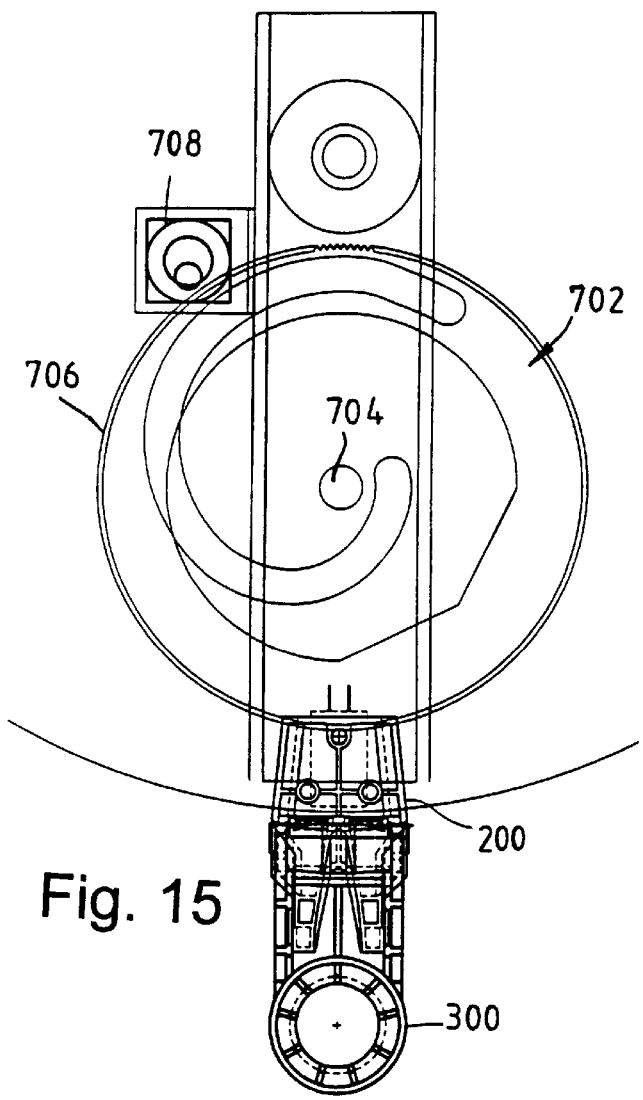
FIG. 15 is a ghost front elevation of a pot lifting and lowering mechanism in accordance with the invention shown in conjunction with the assembly of FIG. 6.

Referring to FIGS. 6, 13 and 14, it will be seen that the retention collar 400 is generally cylindrical and provided with three radially projecting lugs 402 which are located at 120° intervals about its periphery, each at an axial distance which is approximately mid-way between the two end surfaces of the holder.

Each lug 402 is in the form of a flexible bridge, which extends across a respective axially extending channel 403. The radially outer surface of each lug 402 is provided with an axially extending rib 404, mid-way between its two circumferential ends.

The lugs 402 co-operate with the lugs 328 provided in the cylinder 326 of the tool cylinder 302. In use, the retention collar 400 is presented to the cylinder 326, with the ribs 404 circumferentially aligned with the channels 330 provided on the inner face of the cylinder 326. The retention collar is then inserted axially into the cylinder 326, until the advancing end surface of the collar 400 abuts the shoulder 332. At this point, the collar 400 is rotated and the lugs 402 flex radially inwardly, as the ribs 404 are urged out of the channels 330. To secure the collar 400 in place, it is rotated until the lugs 402 are each situated behind a respective lug 328, at which point the ribs 404 become circumferentially aligned with the channels 329 and snap into position due to the inherent flexibility of the lugs 402. The combination of the bridge-shape of the lugs 402 and the channels 403 provides sufficient radial flexibility for this operation to be performed. Once the lugs 402 are located axially behind the lugs 328, the collar 400 is axially secured within the tool cylinder 302. To remove the collar 400 from the tool cylinder 302, the collar 400 must first be rotated against the radial resilience of the lugs 402, until the ribs 404 are once again circumferentially aligned with the channels 330, whereupon the collar can be axially withdrawn.

The retention collar 400 further comprises six internal, axially extending tongues 406, which are arranged in three groups of two, the groups being located at 120° intervals. Each tongue 406 is secured at one end to the inner wall of the collar cylinder 400, and, at the opposite end (towards the top of FIG. 13) is unrestrained, thereby enabling each tongue 406 to flex radially. Each tongue is provided with a radially inwardly facing tool-gripping lug 408 proximate to its distal end. In use, the tongues co-operate to grip the pull-stud of a tool holder 600 to secure the tool axially within the cylinder 302. In this regard, it can be seen in FIG. 6 that the pull-stud of the illustrated tool holder 600 comprises a radial flange 602. In practice, the tool holder is inserted into the tool cylinder 302 from the end of the tool cylinder that is opposite to the end in which the tool holder 400 is inserted. Therefore, the pull-stud of the tool holder enters the collar 400 from the bottom of FIG. 13. As the pull-stud moves between the lugs 408, the tongues 406 move radially outwardly. Once the flange 602 has moved above the lugs 408, as shown in FIG. 13, the tongues snap back into place, thereby resisting downward movement of the pull-stud 600.

Radially inwardly directed struts 410 serve restrict radial displacement of the pull-stud during insertion, thereby protecting the tongues 406 from over-flexion.

As a consequence of the described arrangement, collars having different internal dimensions, for holding tool holders configured to different standards, may be interchangeably secured within the pot cylinder. It is even possible to configure a retention collar to be axially reversible; that is to say with means for gripping one type of pull-stud in one axial end region and different means for gripping a different type of pull-stud in the opposite axial end region.

In use, the bracket units are connected together in the manner shown in FIG. 5. Each bracket unit is provided with a respective pot unit 300, these being connected together as shown in FIG. 6. Each pot unit 300 has a retention collar 400 fitted inside in the manner described above.

Figure 1:
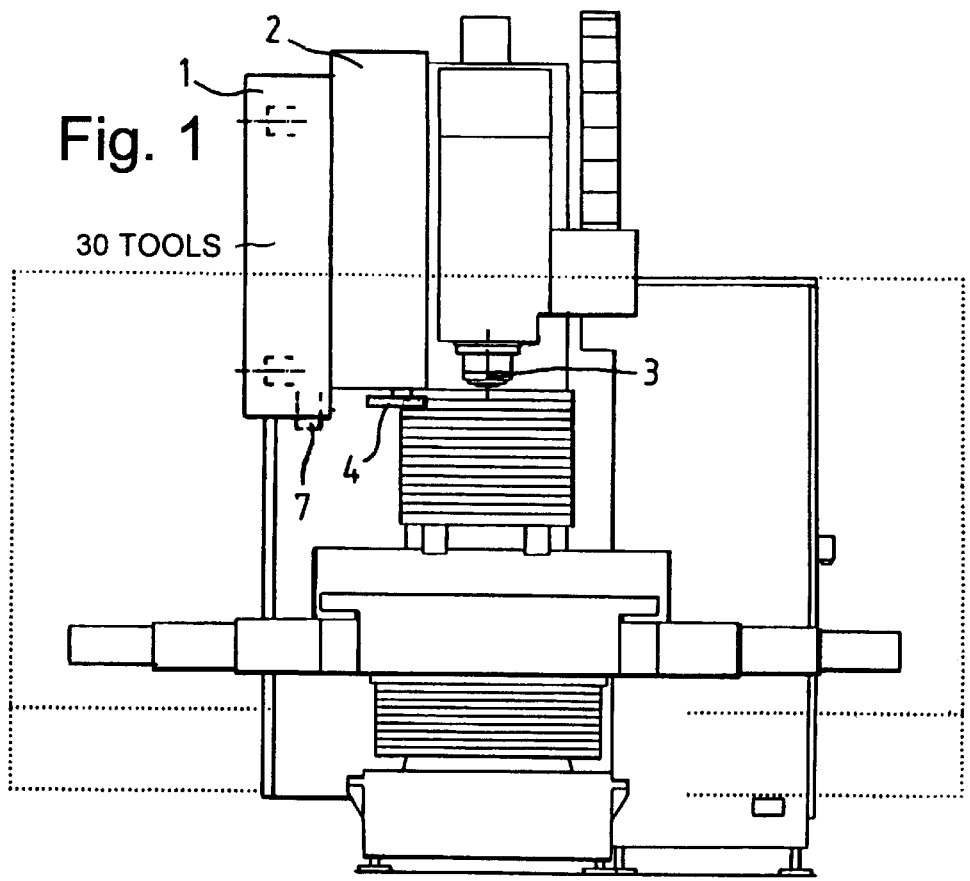
FIG. 1 is a schematic front elevation of a machining centre incorporating a tool changer.
Figure 2:
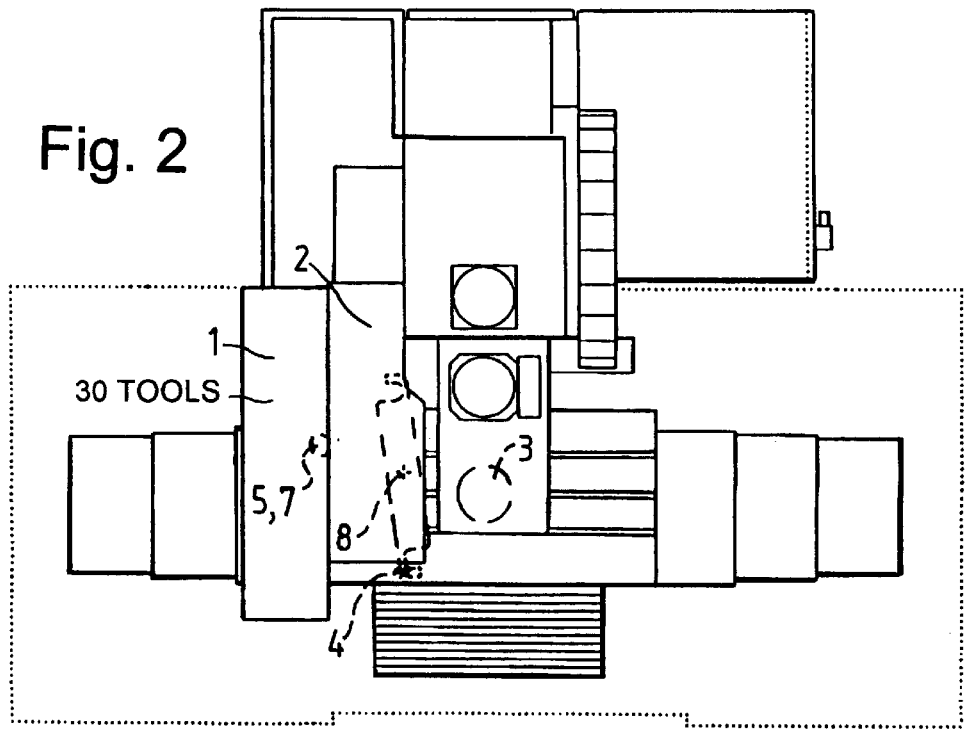
FIG. 2 is a schematic plan view of the machining centre shown in FIG. 1.
Figure 3:
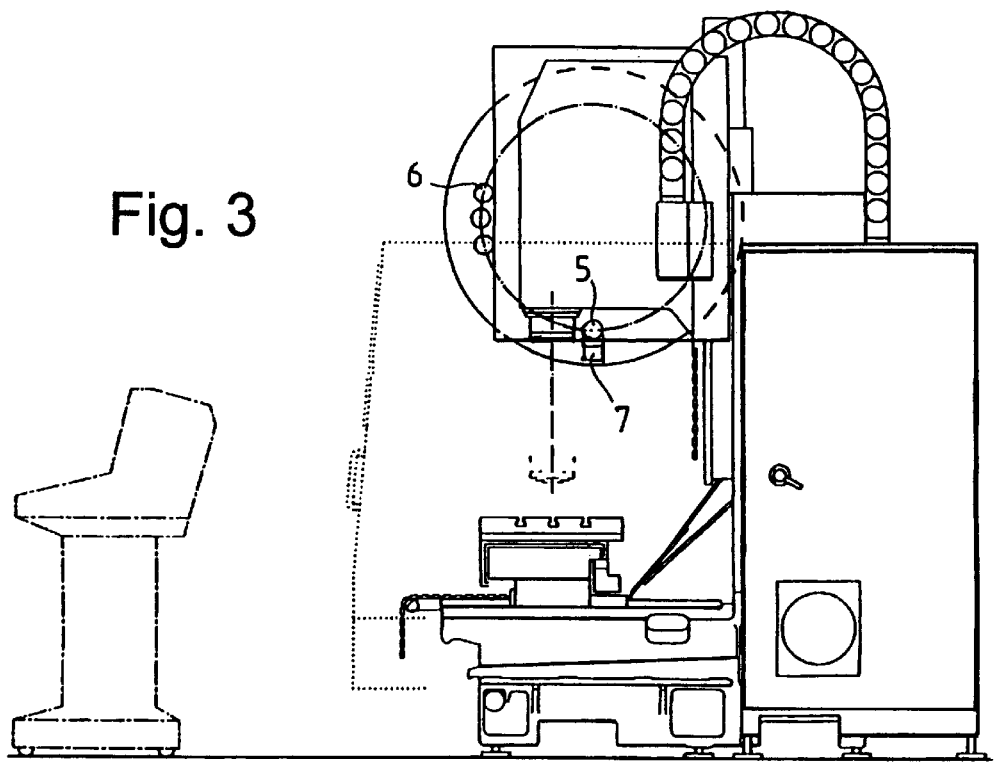
FIG. 3 is a schematic side elevation of the machining centre shown in FIGS. 1 and 2.
Figure 4:
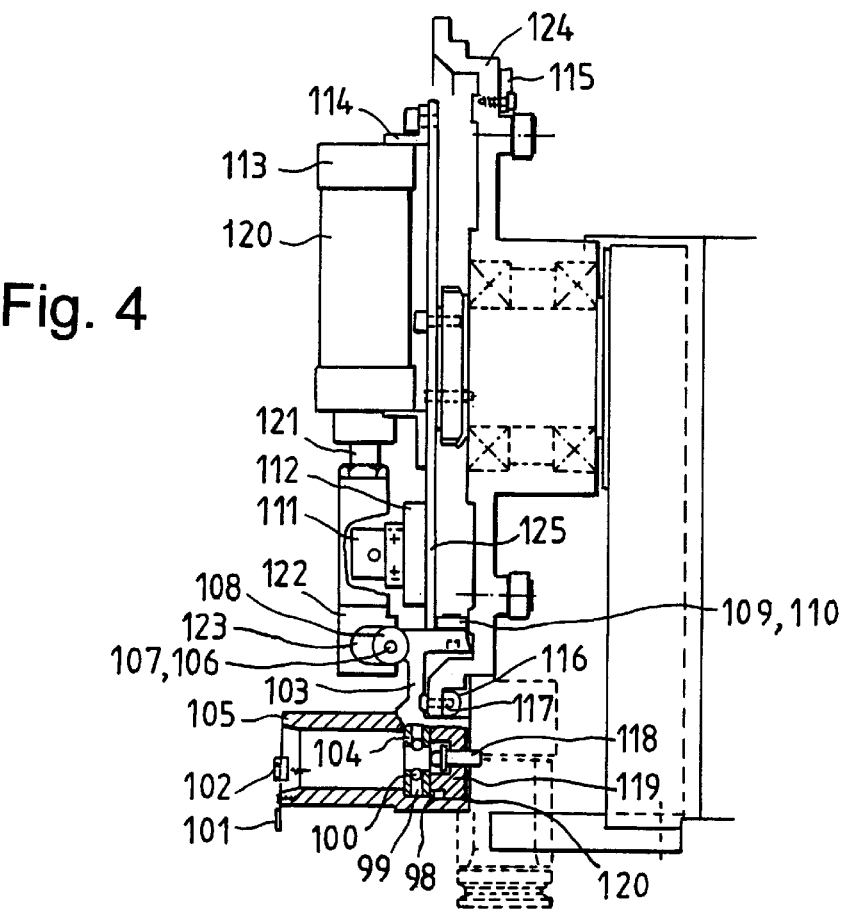
FIG. 4 is a front elevation, partially in cross-section, showing part of a tool changer in accordance with the prior art.

The assembled carousel is fitted to a tool changer of the general type shown in FIG. 1. In this arrangement, the Geneva wheel indexing mechanism will be situated towards the right of the tool carousel, as viewed in FIG. 1, and the open, tool receiving end of each tool cylinder 302 will face towards the left of FIG. 1.

The carousel is caused to rotate using either the Geneva wheel mechanism or the gear rack 210, until the desired tool is situated at the bottom of the tool carousel. When in this position, a tool release mechanism (described below) causes the tongue 206 to lift up, thereby allowing the tool cylinder to rotate around the hinge 240, 312. The rotation of the tool cylinder is controlled by a lifting/lowering mechanism (described below) which interacts with the barrel 318. Once the pot unit has been moved into a position whereby the tool cylinder has its axis vertically aligned, the tool can be removed from the cylinder using a tool arm in the standard manner.

A pot lifting and lowering mechanism 700 will now be described with reference to FIGS. 15 to 19.

The mechanism comprises a vertically-mounted cam wheel 702 which rotates on a horizontal axis 704. The cam wheel comprises a radially outer geared periphery 706 which meshes with drive gearing provided on a drive motor 708.

Figure 16:
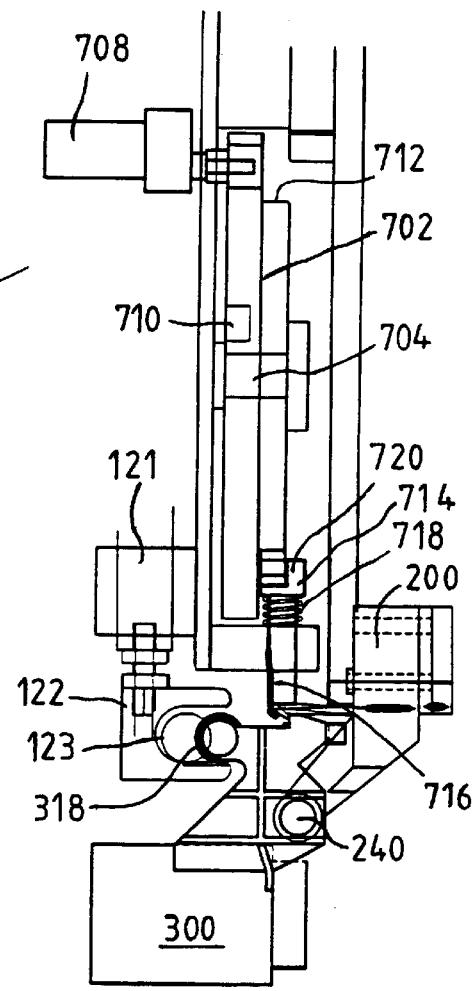
FIG. 16 is a ghost side elevation of the arrangement of FIG. 15.
Figure 18:
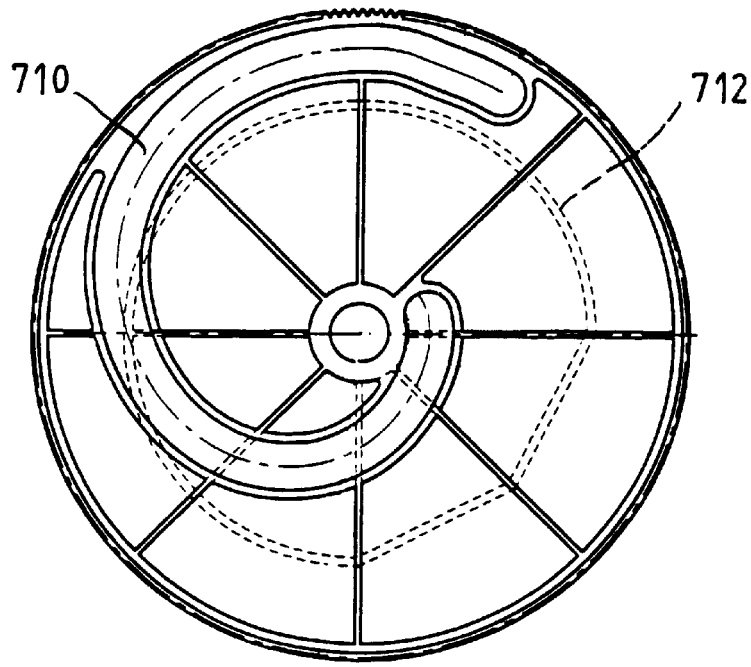
FIG. 18 is a front elevation of the cam wheel of FIG. 17.

The cam wheel 702 comprises two primary camming formations. The first of these is a spiral channel 710 which is moulded into a first face of the cam wheel 720. The spiral channel accommodates a lug (not shown) of a lifting arm 121, which extends generally vertically, as can be seen in FIG. 16. As the cam wheel 702 is caused to rotate by the motor 708, the lug, which is entrained within the spiral channel and which is constrained to move only vertically, is caused to move up or down, depending upon the direction of rotation of the cam wheel 702. This, in turn, causes the arm 121 to move up and down and, thus, the fork 122 with its mouth 123 moves up and down correspondingly.

Figure 17:
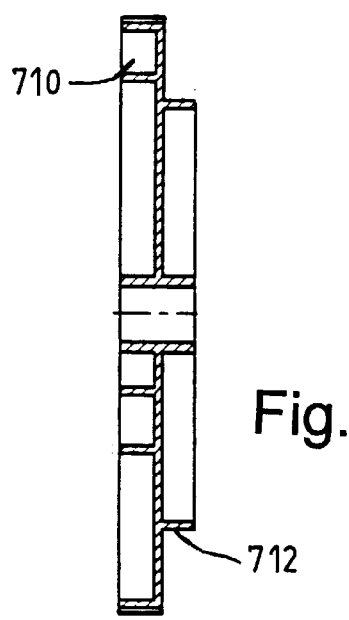
FIG. 17 is a cross-section of the cam wheel of the pot lifting and lowering mechanism of FIGS. 15 and 16.

On its opposite side, as can best be seen from FIGS. 17 and 20, the cam wheel 702 is provided with a generally circumferentially extending camming surface 712. This camming surface bears against a release pin 714, which is vertically mounted and comprises a lifting catch 716 at its axially lowermost end. The lifting catch 716 is hooked underneath he tongue 206 of the bracket unit currently in position. A helical compression spring 718 encircles the release pin 714 between its head 720 and the upper surface of a mounting bracket 722, through which it extends. The compression spring 718 urges the release pin 714 upwards, but this action is resisted by the camming surface 712, which bears on the head of the pin 720.

Figure 19:
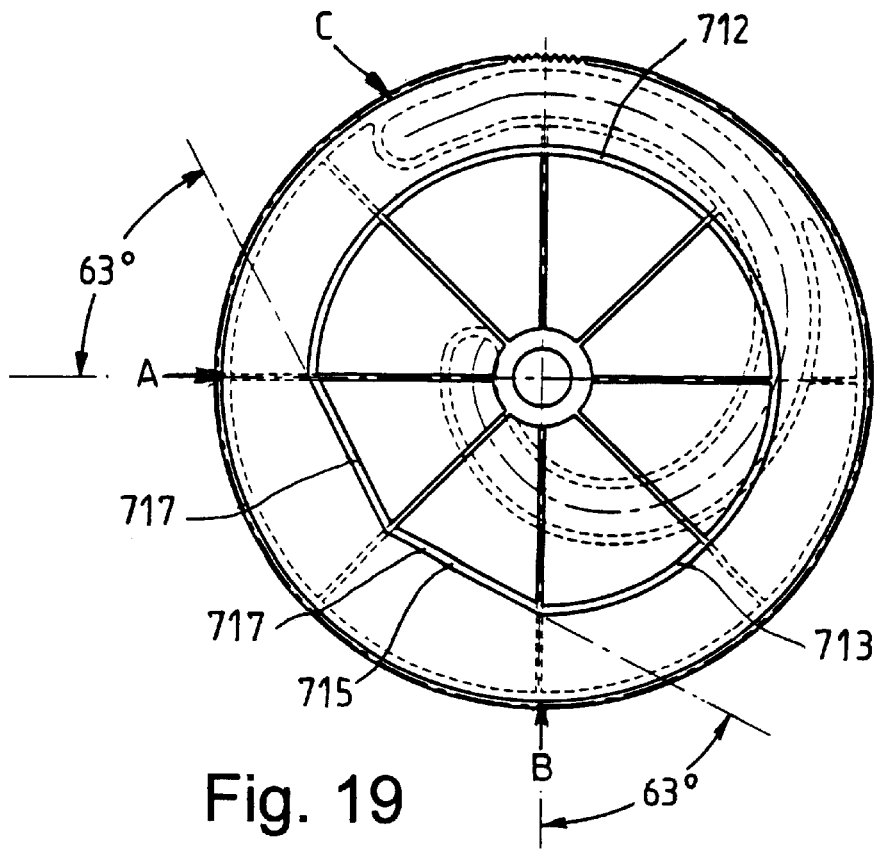
FIG. 19 is a rear elevation of the cam wheel of FIGS. 17 to 19.

Referring to FIG. 19, it will be seen that the camming surface 712 has a part-circular portion 713 that extends for 270° about the axis at a constant, maximum radial distance. Whilst this part-circular bearing surface 713 bears against the head of the release pin 714, the pin is maintained in the lowermost position shown in FIG. 16. However, the camming surface 712 also comprises a chamfered portion 715 defined by two flat portions 717, each of which is radially closer to the rotation axis of the cam wheel 702 than the part-circular portion 713. Consequently, when the cam wheel 702 is rotated to bring the chamfered portion 715 above the release pin 714, the pin is allowed to move upwardly, under the action of the compression spring 718, and the lifting catch 716 lifts the tongue 206 of the pot unit 200 upwards. This releases the pot unit 300 in such a manner that it can be rotated about the hinge 240.

Due to the relative configurations of the spiral 710 and the cam surface 712, at the time that the hinge is lifted upwards, the arm 121 is caused to move downwardly and the fork 122 then begins to push the barrel 318 downwardly, thereby causing the pot unit 300 to rotate about the axis.

More specifically, referring to FIG. 19, when the cam wheel 702 is orientated such that position A on its circumference is at the lowermost point, the arm and the release pin 714 will be positioned as shown in FIG. 16. If the wheel 702 is then caused to rotate in the clockwise direction of FIG. 19, the arm 121 is first lifted slightly, so causing the fork 122 to take the load of the clip 206. The release pin 714 is then allowed to spring upwards, thereby lifting the tongue 206. Thereafter, the arm 121 is gradually lowered, until point B is lowermost, at which time the pot unit has been rotated around the axle 240 to such an extent that it will not longer be interfered with by the tongue 206. Therefore, the cam surface 712 once again lowers the catch. As the cam wheel 702 is rotated further in the clockwise direction, the arm 121 is lowered still further until it reaches a lowest point, when circumferential point C of the cam wheel 702 is lowest. At this point, the tool cylinder 302 has its axis aligned vertically and the tool is ready for removal by the transfer arm 4.

To lift the pot unit, the cam wheel 702 is merely rotated in the opposite direction, so as to move the cam wheel 702 anticlockwise as seen in FIG. 19.

FIG. 20 shows a drive mechanism 800 for use in conjunction with the circular gear track 210. The drive mechanism comprises a motor 801 fitted with a drive shaft 802 with a radial gear 804 for meshing with the drive track 210. The drive shaft is fitted with a steel bar 806 that rotates as the drive shaft 802 rotates. Three proximity switches 808, 810 and 812 are provided along the rotational path of the bar 806. These are connected with a control device 814 that controls the rotational speed of the motor 801.

The operation of the mechanism will now be described with reference to FIG. 21.

Upon application of a current to the motor, it ramps up to a maximum speed indicated at W in FIG. 21. The motor continues at this speed until an end 850 of the bar 806 passes proximity switch 808, as shown in chain-dot line in FIG. 20. Once the proximity switch detects the presence of the iron bar, the motor is ramped down to an intermediate speed, the occurrence of which is shown at X in FIG. 21. The motor then continues to rotate at the intermediate speed, until proximity switch 810 detects the presence of the iron bar. This event is indicated at Y in FIG. 21. It will be seen that the controller 814 then steps the motor down to the minimum rotational speed, until the leading edge of the bar end passes proximity switch 812 and the trailing edge of the bar end simultaneously passes proximity switch 810, when the controller sends a signal for the motor to stop, as indicated at Z in FIG. 21.

This arrangement allows the rotational velocity of the motor to be arrested in a precise and controlled manner that avoids damage to any of the components of the carousel.

Whilst the present invention has been described in connection with what is considered the most practical and preferred embodiment, it is to be understood that this invention is not limited to the disclosed embodiment, but is intended to cover various arrangements including within the spirit and scope of the broadest interpretation so as to encompass all such modifications and equivalent arrangements.

We claim:

1. A drive mechanism for a tool carousel wheel, comprising a drive motor for driving the wheel, a member fitted to the drive shaft of the drive motor and rotatable therewith, a plurality of proximity switches for generating proximity signals as the said member passes and control means for receiving the signals from the proximity switches and controlling the rotational speed of the said motor to correspond to different speeds with reference to the rotational position of the drive shaft.

2. A driving mechanism according to claim 1, wherein the control means switches the motor between a relatively fast speed, an intermediate speed and a relatively low speed.

3. A drive mechanism according to claim 2, comprising three proximity switches situated at regular intervals along the path of travel of the said member.

* * * * *